Jan. 23, 1940.  M. E. GATES  2,188,003

PUMP

Filed April 6, 1936

Inventor:-
Major E. Gates,
By Roland C. Rehm
Atty.

Patented Jan. 23, 1940

2,188,003

UNITED STATES PATENT OFFICE 2,188,003

PUMP

Major E. Gates, Crystal Lake, Ill.

Application April 6, 1936, Serial No. 72,945

3 Claims. (Cl. 103—116)

This invention relates to pumps, and among other objects aims to provide an inexpensive pump particularly adapted for low capacity delivery and for handling viscous liquids.

The nature of the invention may be readily understood by reference to one illustrative construction embodying the invention and shown in the accompanying drawing.

Figure 1:
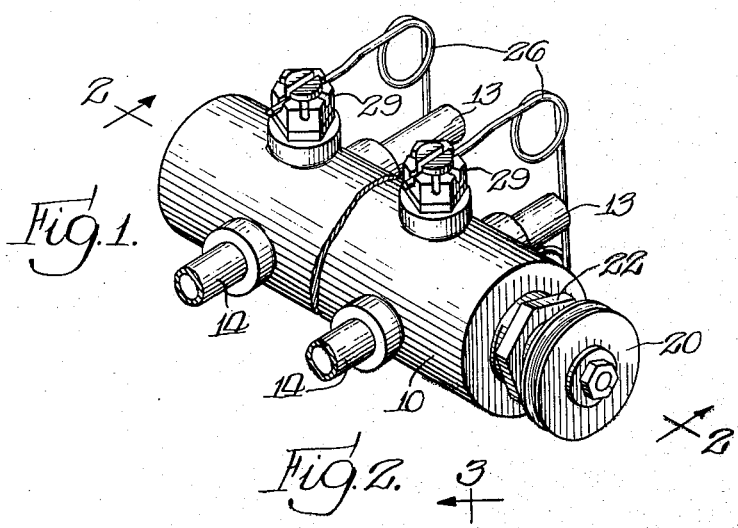
Fig. 1 is a perspective view of the illustrative pump.
Figure 2:
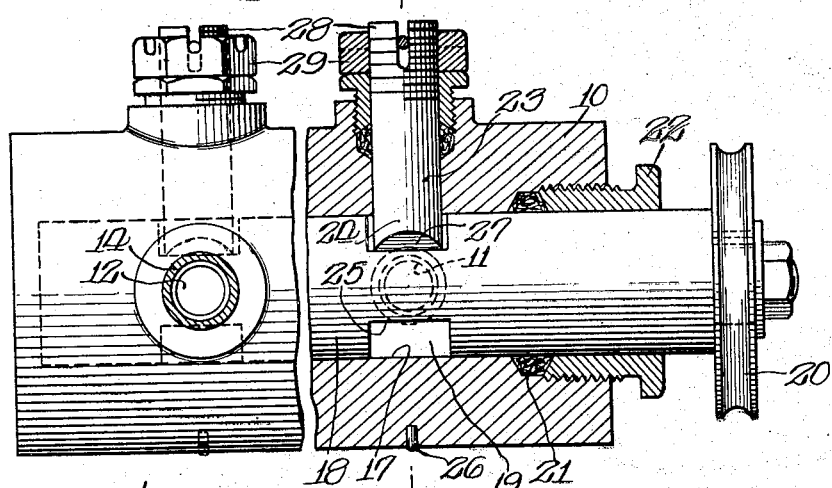
Fig. 2 is a longitudinal section taken on the plane 2—2 of Fig. 1.
Figure 3:
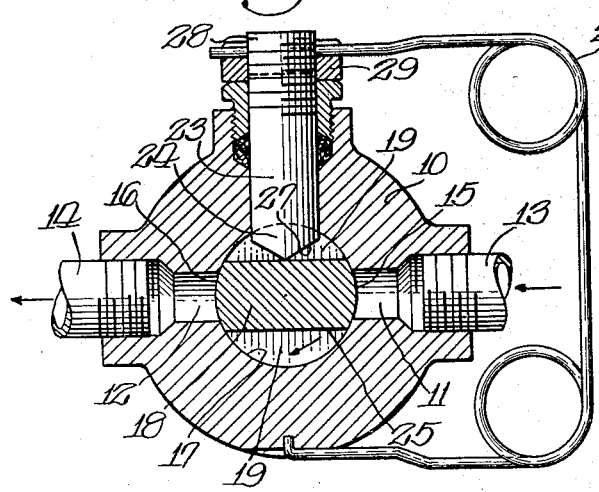
Fig. 3 is a transverse section taken on the plane 3—3 of Fig. 2.

The illustrative pump is designed for handling viscous liquids and for low capacity duty such as the feeding of oil at a predetermined rate to burners and the like. For these services among others, ordinary pumps are not well adapted. Their cost is high compared to the service they are required to perform and adequate control or regulation is, in many instances, unsatisfactory. The illustrative pump is not only extremely inexpensive but it is reliable and capable of precise regulation and control.

As here shown, the pump comprises a casing 10 having an inlet passage 11 and an outlet passage 12. Connected to the respective passages are pipes or other appropriate conduits 13 and 14 which convey liquid to the pump and conduct the same therefrom to the point of delivery. The passages 11 and 12 terminate in ports 15 and 16 respectively in a cylindrical chamber 17 within the casing 10. Rotatable within chamber 17 is a cylindrical pump member 18 which fits the chamber and is provided with a plurality of recesses or pockets 19, which, upon rotation of the pump member, successively communicate with the inlet and outlet ports 15 and 16. The pockets are here shown in the form of transverse slots which are cut or otherwise formed in the cylindrical body of the pump member 18. One end, at least, of the pump member projects from the casing 10 and is provided with driving means such as a gear or pulley 20. A stuffing box 21 and packing gland 22 seal the pump member against escape of liquid from the chamber.

Cooperating with the recesses 19 is a plunger 23 whose extremity 24 is adapted to enter and withdraw from the recesses 19. In the present instance, plunger 23 is reciprocated by the rotary pump member 18, the bottoms 25 of the recesses serve as cam surfaces to cause the plunger to withdraw from the recesses. A spring 26 presses the plunger towards the pump member and causes it to maintain engagement with the pump member.

Figure 4:
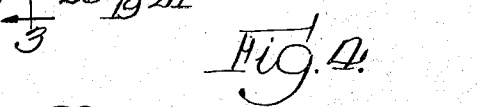
Fig. 4 is a view similar to Fig. 3 but showing the pump in a different position.

The plunger 23 is located between ports 15 and 16 and the latter are so arranged relative to the plunger, that on rotation of the pump member, the plunger is caused to withdraw from one recess and to enter the next when the latter comes into registry with the plunger. If, as illustrated in Fig. 4, the pump member be rotated in a clockwise direction, the plunger will be caused to withdraw from a recess 19 when the latter is in communication with or about to communicate with port 15. This action allows the recess 19 to become filled with liquid which enters through port 15. If the arrangement be such that the plunger is substantially withdrawn from the recess before the latter uncovers port 15, a vacuum will be created which on communication with port 15 will cause liquid to be drawn into the port. It is generally desirable, however, to design the device so that withdrawal of the plunger occurs entirely while the recess is in communication with the inlet port. This avoids the possibility of air leakage into the recess (as might be the case if a partial vacuum were created in the recess) and avoids the necessity for extremely close manufacturing tolerances. The rotary pump member should have a running fit with its casing which is sufficient to prevent leakage of fluid between the ports.

Whether the withdrawal of the plunger occurs wholly or partly before communication with port 15, the result in either case will be that the recess 19 will be filled with liquid. Further rotation of the pump member carries the filled recess into communication with port 16, at which time the plunger 23 enters the recess displacing an equal volume of liquid through port 16. The maximum displacement should occur before the recess 19 wholly leaves port 16. The amount of liquid thus displaced depends upon the extent to which the plunger enters the recess 19. Other recesses pass through the same cycle. The number and size of the recesses obviously may be varied. Two are shown in the present instance.

In the present design wherein the ports are opposite and the plunger midway between them, the end 24 of the plunger is oppositely beveled as at 27 so that movement of the plunger in a recess occurs only while the recess is in communication with its port.

A fine adjustment of the output of the pump may be effected by adjusting the forward limit of travel of plunger 23. In the present instance, the outer extremity 28 of the plunger is screw-threaded and provided with a nut 29 whose engagement with the casing limits the extent to which the plunger enters the recess. Nut 29 is preferably of the castle or notched variety and is engaged by the extremity of spring 26, which therefore serves to prevent accidental rotation of the nut. The spring also extends through a notch in the plunger to hold it against rotation. Rough adjustment of the pump delivery may be made by varying the speed of rotation of the pump member.

The pump may be advantageously used to handle viscous and sticky liquids since the ports, passages, and recess 19 may be made larger without altering the design or decreasing its reliability or the regularity of feed. Withdrawing of the liquid is therefore avoided.

If desired, the pump member may be elongated (as shown), and a plurality of sets of ports and plungers may be employed which, if desired, may each be independent, thus combining in one apparatus a plurality of pumps each of which may be independently adjusted and if desired, connected to different sources of supply and points of delivery.

If the aforesaid plurality of sets of ports are connected together, preferably the recesses and plungers should be arranged to operate in different phases so that all do not deliver at one instant. Obviously, the rate of delivery may be made very small. Yet small though it is, the delivery will, nevertheless, be reliable and uniform. Wide variation in rate of delivery may be secured (even without stopping the pump) simply by rotating the adjusting nut 29 to vary the extent to which the plunger is permitted to enter the recesses and therefore to vary the amount of liquid displaced at each cycle. The plunger and recess satisfactorily prevent longitudinal movement of the rotary pump member, and the casing 10 may therefore be closed at one end. The pump may be made at very low cost compared to the cost of ordinary pumps available for equivalent service.

Obviously the invention is not limited to the details of the illustrative construction since these may be variously modified. Moreover, it is not indispensable that all features of the invention be used conjointly since various features may be used to advantage in different combinations and sub-combinations.

Having described my invention, I claim:

1. A variable delivery liquid pump of the character described comprising in combination a casing having a cylindrical bore provided with inlet and outlet ports, a cylindrical rotary device in said bore having a liquid chamber in its cylindrical surface rotatable in succession past said inlet and outlet ports, a reciprocal plunger carried by said casing between said ports and in registry with the path of said chamber and movable into said chamber and operable only on its outward movement to cause liquid to enter said chamber and only on its inward movement to displace fluid therefrom, the cylindrical surface of said bore surrounding said plunger being unbroken so as to confine the liquid chamber to said rotary device, said plunger being smaller in transverse section than that of said chamber to provide clearance between the plunger and the sides of said chamber, the surface of the bottom of said chamber and the bottom surface of said plunger being shaped so as not to cam said plunger out of the chamber before the latter has come into communication with the inlet port, and means for moving said plunger into said chamber as the latter comes into communication with said outlet port.

2. A liquid pump of the character described comprising in combination a casing provided with a bore therein having inlet and outlet ports, a rotary cylindrical device mounted in said bore and having a chamber in its cylindrical surface rotatable in succession past said inlet and outlet ports, said chamber being circumferentially shorter than the angular distance between said ports so as never to communicate with both ports at the same time, a member located between said ports and in registry with the path of said chamber periodically movable into said chamber only when the latter is in communication with the outlet port, the cylindrical surface of said bore surrounding the plunger being unbroken so as to confine the liquid chamber to said rotary cylindrical device and means for moving said member into said chamber to displace fluid therefrom directly into the outlet port, said recess having a surface designed to only move said member out of said recess for filling said recess when the latter is in communication with said inlet port.

3. A metering liquid pump of the character described comprising in combination a casing having a bore therein and having inlet and outlet ports, a rotary member mounted in said bore and having a chamber therein movable in succession across said ports, a volume displacing plunger between said ports and in registry with the path of said chamber and movable into said chamber only while the latter is in communication with said outlet port to displace fluid from said chamber directly into said outlet port, the cylindrical surface of said bore surrounding said plunger being unbroken so as to confine the liquid chamber to said rotary member said chamber having a surface designed to cam said plunger out of the chamber only while said chamber is in communication with said inlet port upon continued rotation of said member, and means for adjusting the extent to which said plunger enters said chamber to vary the delivery of said pump.

MAJOR E. GATES.